Feb. 4, 1958  G. B. RICHARDS  2,821,994
LIQUID VALVES
Filed Aug. 25, 1955
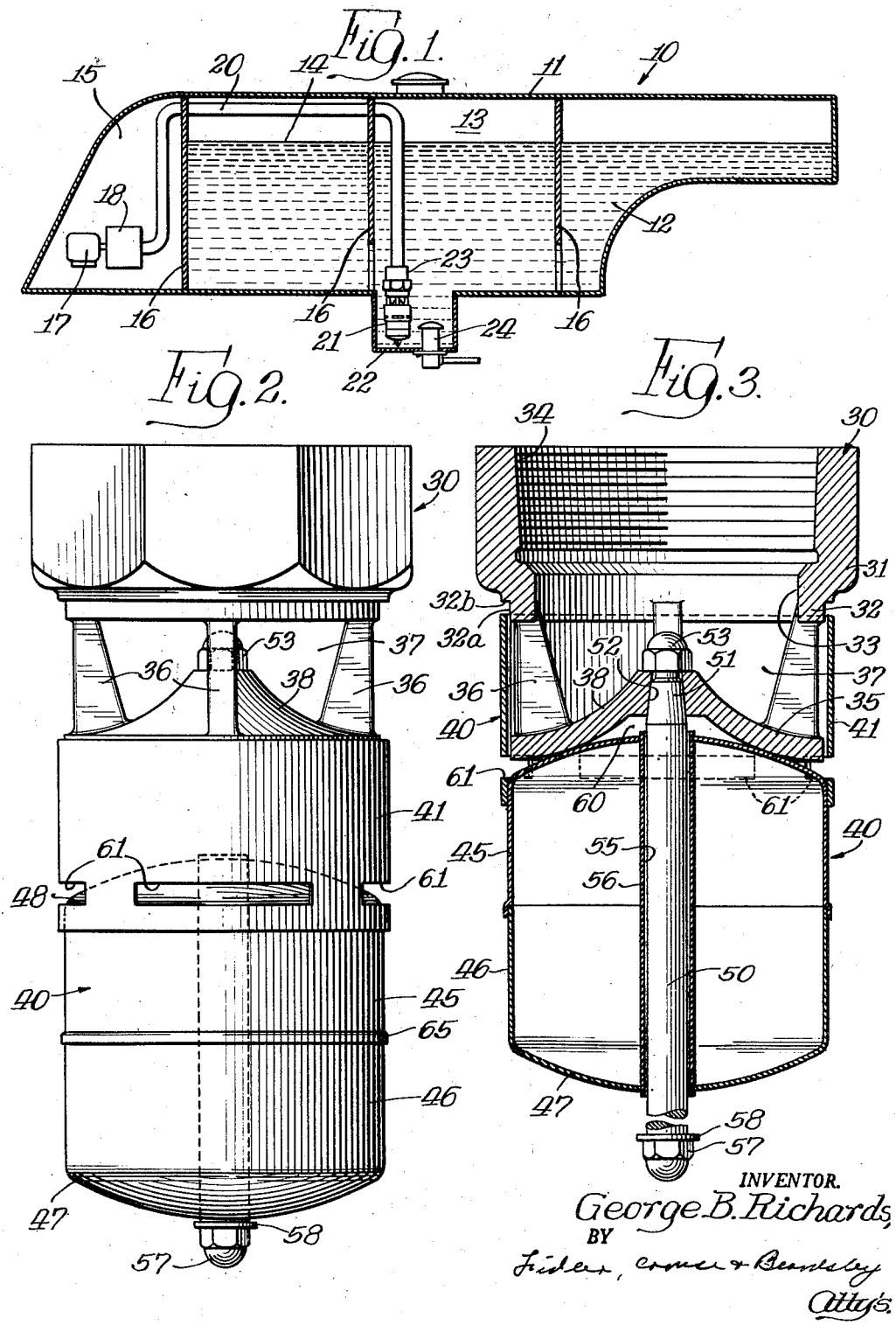
INVENTOR.
George B. Richards,
BY
Fisher, Cromer & Beardsley
Attys.

United States Patent Office 2,821,994
Patented Feb. 4, 1958

2,821,994
LIQUID VALVES

George B. Richards, Deerfield, Ill., assignor, by mesne assignments, to Liquid Controls Corporation, North Chicago, Ill., a corporation of Illinois Application August 25, 1955, Serial No. 530,551

12 Claims. (Cl. 137—433)

This invention relates to liquid valves and has to do more particularly with a valve of a type wherein the opening and closing of the valve is effected by the movement of a float adapted to be supported by a liquid.

Valves wherein the opening and closing is effected by the movement of a float buoyantly supported in a liquid have been known in various forms and have been employed in various applications. One such application is the use in connection with the separation of two immiscible liquids of different specific gravities. Many liquid products, as for example, gasoline, are customarily stored in large stationary tanks and are transported in tank trucks. Water such as water of condensation, is commonly present in the tanks and it is usually considered essential that such water be removed to insure that none of the water is withdrawn from the tank along with the gasoline. Accordingly, it is common practice to provide a segregator or dump valve which is intended to function to withdraw from the bottom tank any water which may be in the tank. Such segregators often are incapable of removing all the water, and sometimes become wholly inoperative. To insure that the water will not be drawn into the withdrawal line, should the segregator become ineffective, there is usually provided a valve (commonly known as a "water locking" valve) at the intake of the withdrawal line which functions to close the intake should the water level in the tank rise to the level of the intake.

Such water locking valves have customarily taken the form of a valve housing adapted to be connected to the intake of the withdrawal pipe or hose and having therein a poppet type valve carried by a float which is so constructed as to sink in gasoline or other light product but to float in water. The valve thus remains open when no water has collected in the bottom of the tank or the level thereof is below the level of the intake. However, when the level of the water rises sufficiently, the float is raised thereby, the arrangement being such that the float closes the valve before the water level reaches the inlet of the valve.

Poppet type valves such as heretofore employed as water locking valves have certain disadvantages, one of which is that they are not fully balanced and therefore are subject to being closed by the flow of fluid and without the presence of water sufficient to lift the float to valve-closing position. This results from the action known as the "Bernoulli effect" wherein the flow of liquid through a valve seat creates a zone of reduced pressure in the liquid on a surface opposite the valve seat orifice. In a poppet valve, the valve member has a face opposite the valve seat orifice, and therefore there is created a conical zone of reduced pressure on the valve face opposite the valve seat orifice which is less than the pressure in the other face of the valve, thereby urging the valve toward closed position.

This type of valve also is subject to the disadvantage that once having closed, it is difficult to open it owing to the pressure differential on opposite sides of the valve seat which tends to maintain the valve closed. This is especially likely where a check valve is provided in the line ahead of the water locking valve.

An object of my invention is to provide a new and improved float-controlled valve.

Another object is to provide a float-controlled valve which is extremely simple in construction, inexpensive to manufacture, which requires no adjustment, and which is not likely to get out of order over a long period of use.

Another object is to provide a float-controlled valve which is balanced, and may be opened and closed by a relatively small force and hence can be operated by a relatively light, small float.

Another object is to provide a fully balanced, float-controlled valve wherein the reduced pressure, Bernoulli effect, in the valve is ineffective to cause closing movement of the valve member.

Still another object is to provide a fully balanced float-controlled valve having a fixed, rigid member having a surface opposite the valve seat orifice and an open ended, sleeve-like, valve member slidable on the fixed member.

Still another object is to provide a float-controlled valve having a fixed wall member disposed opposite the valve seat orifice with inlet ports located between the fixed wall and the valve seat and a valve member of sleeve form slidable over the end wall into and out of seating relation with the seat to close and open the inlet ports.

A further object is to provide a float actuated, balanced valve having a relatively large liquid flow capacity, but which valve is of relatively small transverse dimension and can be inserted through a small opening and therefore is admirably adapted for use as a water locking valve.

A further object is to provide a float controlled balanced valve wherein the float is rigidly connected to the movable valve element and is coaxially disposed with respect thereto and does not project beyond the peripheral limits of the valve element.

Still another object is to provide a float controlled balanced valve wherein the float is located only a slight vertical distance from the valve port whereby the valve is opened or closed when the level of the liquid supporting the float is closed to the level of the valve port.

Another object is to provide a float-controlled valve which is balanced, and may be opened and closed by a relatively small force, thereby eliminating the necessity for any linkage or other force-multiplying means between the float and the movable valve element.

Another object is to provide a float-controlled valve which is extremely simple in construction, is relatively small and compact, is positive in operation, requires no adjustment, and requires a minimum of repair or replacement of parts over a long period of use.

Another object is to provide a balanced, float-controlled valve of such construction that it is not subject to sticking or jamming owing to the presence of dirt or gummy residues.

Still another object is to provide an improved float-controlled valve which is especially useful as a water locking valve for preventing the entry of water into the withdrawal or discharge line of a tank adapted to contain a light liquid, such as a petroleum product.

Other objects and advantages will appear from the following description taken in connection with the appended drawings, wherein:

Figure 1 is a somewhat diagrammatic view illustrating one application of my valve;

Fig. 2 is a side elevation view of a valve constructed in accordance with my invention; the valve being shown in open position; and Fig. 3 is a vertical sectional view through the valve of Fig. 2, the valve being shown in closed position.

The valve of my invention is capable of use in a number of different applications. It is excellently adapted for use as a water lock valve and for the purpose of illustrating the invention I have shown it in such an application although it will be understood that the invention is not thus limited.

I have shown somewhat diagrammatically in Fig. 1 a typical installation of a water locking valve. The valve is shown in connection with its application to the discharge of liquids from a tank truck or trailer.

The tank trailer 10 (a portion only of which is shown) includes a tank 11 divided into a plurality of compartments 12, 13, 14 and 15 by partitions 16. The forward compartments are adapted to contain a liquid product such as gasoline, and the rearward compartment is adapted to contain discharge and control equipment including a motor 17 and a pump 18 for withdrawing liquid from the tank.

Connected to the intake of the pump 18 is a withdrawal or discharge pipe 20 the intake end of which is located adjacent the bottom of the tank 11 and has connected thereto a water locking valve 21 which extends into a sump 22 below the level of the bottom of the tank.

A foot valve 23 may be provided above the water locking valve 21. A water dump valve or segregator 24 has its upper portion disposed in the sump and its discharge leading from the segregator outside of the sump to a point of discharge (not shown). The foot valve 23 and the segregator 24 may be of any suitable construction and function in the usual manner, and since they form no part of the present invention they are not shown or described in detail.

Referring now particularly to Figs. 2 and 3 of the drawings, I have illustrated a preferred form of float-actuated valve constructed in accordance with my invention. The valve is shown in the form which adapts it for connection to the lower end of the discharge pipe 20 or to the foot valve where such valve is provided.

The valve includes a valve seat member 30 having a connector or coupling portion 31 which, in the present embodiment, takes the form of a tubular pipe connection, internally threaded as at 34 whereby it may be screwed onto the externally threaded end of the pipe or foot valve (not shown). The connecting portion 31, instead of being formed as a pipe connection as shown in Figs. 2 and 3, may be formed as a flange (not shown) whereby the valve may be connected to any other suitably formed member such as a pipe flange or a housing or the like.

The valve seat member 30 also has an annular seat portion 32 through which extends an outlet opening or orifice 33 which communicates with the passage through the connector portion 31. The valve seat is formed on the seat portion 32 and has a cylindrical surface 32a and an annular surface 32b which extends at right angles to and intersects the cylindrical surface 32a. The cylindrical surface 32a is coaxial with the major axis of the valve.

Disposed opposite the outlet opening or orifice 33 and in alignment therewith is a fixed end wall 35 which is supported from the connecting portion 31 by a plurality of ribs 36 extending from the connecting portion to the end wall and integral with both such portions. The ribs 36 are spaced apart to provide a plurality of inlet ports 37 which communicate with the outlet opening 33. It will be understood that instead of providing a plurality of ribs, the end wall 35 may be connected to the connecting portion by a generally cylindrical wall (not shown) having one or more ports therein. However, the construction herein shown provides for the maximum flow of liquid through the inlet ports 37 without undue sacrifice in the strength of the structure.

The inner face 38 of the end wall 35 preferably is of generally conical form with the face concavely arcuate in shape, as shown, in order to provide a somewhat streamlined flow of liquid through the ports 37 toward the outlet opening 33. The end wall 35, as a whole, preferably is of generally conical shape although it may take any other suitable shape.

Slidable on the valve seat member 30 between a position against the valve seat and closing the ports 37 and a position away from the valve seat and exposing the ports 37 is a movable valve member 40. The valve member 40 preferably includes a cylindrical portion 41 which is slidable over the end wall 35 and in open position (Fig. 2) has its inner end disposed outwardly beyond the inner portion of the end wall 35 so as to completely expose the ports 37. The cylindrical portion 41 of the valve 40, in its inner or closed position (Fig. 3), is disposed in closing relation with the seat 32 and therefore closes the ports 37 and cuts off communication between the outlet opening 33 and the space surrounding the valve member 40.

The cylindrical portion 41 preferably terminates short of the annular surface or shoulder 32b of the valve seat, as shown particularly in Fig. 3 of the drawings, in which case the cylindrical surface 32a serves as the seating surface. However, if desired, the portion 41 may be so dimensioned that when in closed position it abuts the annular surface 32b, in which case the latter functions as the seating surface.

Secured to the valve member 40 is a float 45 which may be of any suitable form but which preferably has cylindrical side walls 46 and arcuate end walls 47. Preferably the float is of substantially the same diameter as the valve member 40. The float 45 is suitably secured to the valve member 40 and preferably it is secured by inserting the upper end of the float member 45 in the lower end of the valve member 40 and by welding the members together at their points of engagement as indicated in Fig. 3 of the drawings. The float 45 preferably is formed by a pair of cup-shaped sections which are disposed in opposition with their open ends facing and with one of the ends telescoped into the other and secured thereto as by welding at 65 as illustrated in Figs. 2 and 3.

The float 45 and connected valve member 40 are guided for vertical movement relative to the valve seat member 30 and are retained against complete displacement from the valve seat member by a guide stem 50 which has an upper tapered end 51 extending through a tapered opening 52 in the end wall 35 and tightly secured therein by a cap nut 53 threaded on the upper end of the stem 50.

The float 45 has a passage 55 extending longitudinally therethrough to receive the stem 50, and which is defined by a tubular member 56 sealingly secured to the upper and lower end walls 47 of the float 45. The float and valve member 40 are retained against downward displacement of the stem 50 in a suitable manner as by a cap nut 57 threaded onto the lower end of the stem 50. Clamped between the nut and a shoulder (not shown) on the guide stem 50 is a washer 58 which serves as a lower rest or stop for the end of the tube 56 and consequently the tank 45 of which the tube 56 forms a part.

Thus it will be seen that the valve member 40 and the connected float 45 are positioned and guided for limited movement between a position wherein the lower end of the tube 56 abuts the washer 58 and the valve member 40 completely clears the ports 37 and an upper position wherein the upper end of the upper end wall 47 abuts the lower surface of the end wall 35 and the valve member completely closes the ports 37.

It will be noted that when the valve member 40 and float 45 are in their lower position a chamber 60 of substantial volume is provided between the float 45, the valve member 40, and the wall 35 which is reduced to a relatively small volume chamber when the movable members are in their upper position. In order to prevent any vacuum produced in this chamber upon a downward movement of the movable assembly and pressure produced in the chamber upon the upward movement of the movable assembly from interfering with the operation of the valve, I vent this chamber by providing a plurality of venting slots 61 formed in the valve member 40 adjacent and slightly above the point of connection of the valve member 40 and the float 45. Thus these venting openings are in such position that the chamber 60 is vented at all times to the space surrounding the valve member 40.

In the use of the valve disclosed herein as a water locking valve to which application is excellently well adapted, the valve is connected to the lower end of a withdrawal or discharge pipe such as the pipe 20 shown in Fig. 1 with the inlet ports 37 being disposed at the level of the bottom of the tank. Thus the remainder of the valve is located in the sump 22. This arrangement insures that all of the liquid product, such as gasoline, can be pumped from the tank with the exception of the very small amount which may be present in the sump below the level of the valve inlet ports 37.

If there is no water in the tank and only gasoline is in the tank and in the sump, the valve 40 and float 45 will remain in their lowermost position and the inlet ports 37 of the valve will be completely uncovered. Thus when the pump is energized to discharge gasoline from the tank, it will be drawn from the upper portion of the sump through the inlet ports 37 and thence through the outlet port 33 and through the pipe 20 from whence it is discharged in the usual manner.

Should any water enter the tank 11 or any moisture vapor condense, it settles to the bottom of the tank and passes into the sump. The segregator functions in the usual manner to discharge water, but not lighter products such as gasoline from the sump. Accordingly, under normal conditions and when the segregator 24 is operating effectively to discharge water from the sump, the float and valve member 40 remain in their lower position owing to the fact that the buoyancy of the product such as gasoline is not sufficient to cause the float to be supported thereby.

Should, however, water collect in the sump faster than it can be discharged by the segregator and the level thereof rise to the point where the float is buoyantly supported by the water, the float and valve thereafter will rise with the level of the water. Should the level of the water continue to rise and approach the level of the inlet ports 37, the float and the valve member 40 will rise to cause the valve member to close the ports 37 and prevent any flow of product through the inlet ports 37. Thus, should the pump 18 be energized at any time when the level of the water is so high that it might otherwise be drawn into the discharge pipe 20, this will not occur owing to the fact that the valve is closed and prevents withdrawing of products from the tank. The operator is thereby notified that the level of water in the sump is above normal and he can then investigate to determine the cause of such abnormality and rectify the same after which the valve will open and permit withdrawal of products from the tank.

When the valve of my invention is to be used in certain installations, as for example when it is used as a water locking valve, it is not necessary to provide a tight seal between the valve member and the valve seat. Accordingly, the valve is so formed (as shown particularly in Figs. 2 and 3) so that there is some clearance between the valve member 40 and the periphery of the end wall 35 and similarly there is a slight clearance between the valve member 40 and the cylindrical face 32a of the seat 32. Also, where, as explained above, the valve is constructed so that the end of the cylindrical portion abuts the annular face 32b, it is not necessary that the end of the valve member 40, when in closed position, tightly abuts the annular face 32b. By providing a slight clearance between the valve member and the valve seat member as just explained, I insure that there will be no sticking or jamming of the valve even though grit or gummy residue may find its way between the movable valve member and the valve seat member.

It should be explained at this point that the valve members need not have liquid-tight sealing therebetween in the application here shown for the reason that if the valve is effective to provide substantial closure of the openings, the flow of liquid through the valve ports will be halted and the suction of the pump will not be sufficient to draw product through the valve and pipe. On the other hand, where the valve is to be used in installations where it is desired to prevent any flow through the valve I provide a closer fit between the movable and fixed valve members. Accordingly, it will be understood that where the term "seated" or any equivalent thereof is used herein, it encompasses a condition wherein the members not only are in tight sealing relation, but also where there is a slight operating clearance between them.

From the foregoing it will be seen that I have provided a float-controlled valve of extremely simple and compact construction. The valve has only two major parts or assemblies and each of them is extremely simple in construction. Thus, the valve may be manufactured very inexpensively. Moreover, the valve requires no adjustment and will require a minimum of repair or replacement of parts over a long period of use. The valve may be made relatively strong and rugged for any particular size and therefore is not relatively fragile or sensitive to shocks or other normal abuse due to shipping and handling.

The construction of my valve is such that while the Bernoulli effect is present it does not in any way unbalance the valve. It will be seen that in my valve there is a zone of reduced pressure, when the liquid is flowing, through the valve seat orifice which zone extends in a conical form above the upper face of the fixed end wall. However, because of the shape and arrangement of the movable valve member, this reduced pressure is not effective to move the movable valve member toward closed position.

Since the valve is balanced it requires a relatively small force to cause it to open and close. Accordingly, it may be operated by a relatively light small float thus contributing to the economy of the valve and to the compactness of the construction. It will be noted that because of this feature no linkage or any other force multiplying means is required between the float and the movable valve element.

Moreover, the construction is such that the movable valve element will not be held in closed position unless the float is maintained at a suitable height by a sufficient level of water. Thus, if the water level drops sufficiently even during the period when suction is being drawn on the line the valve will open.

While I have shown the valve used in connection with a pump for producing suction in the withdrawal line, it will be understood that the flow of liquid through the valve may be produced by a gravity flow of the liquid in the withdrawal or discharge line.

The valve not only may be employed in the particular application shown but it may be employed in inverted position from that shown and may be used as a liquid segregator or dump valve. In that application the float is adapted to float in the water or heavier liquid which is below the gasoline or lighter liquid and thus so long as the level of the heavier liquid is sufficiently high the valve remains open to allow the liquid to discharge. However, when the level of the heavier liquids falls sufficiently the float moves downwardly to a position wherein it closes the valve and halts further discharge of the heavier liquid.

The valve inverted as above described also may be employed in a similar manner to separate air or other gas from a liquid.

The valve of the present invention is admirably adapted for use as a water locking valve. In addition to the features above referred to, it will be seen that the valve is so formed that the float does not project laterally beyond the movable valve element and the latter is of smaller transverse dimension than the valve seat member. Accordingly the valve unit may be made with a relatively small transverse dimension, even where the valve is to have a relatively large liquid flow capacity and accordingly the valve unit may be introduced into a tank through a relatively small opening as for example the usual double tapped tank bushing. Moreover, the float is located close to the level of the valve port and accordingly operates to open or close the valve when the level of the liquid supporting the float is close to the level of the valve ports. In addition, the unitary valve member and float are free to rotate about the guide stem with the liquid, in the vortex formed around the valve ports, and there is no tendency of these members to bind against the fixed portion of the valve.

I claim:

1. A float-controlled valve, comprising a seat element having a valve seat, an opening through said seat, an end wall opposite said opening and a port between said end wall and said seat and communicating with said opening, a valve element externally of and slidable on said seat element between a seating position relatively to said seat and closing said port and a position away from said seat and exposing said port, and a float rigidly connected to said valve element coaxially therewith for opening and closing the valve in accordance with the level of a liquid by which said float is buoyantly supported.

2. A float-controlled valve, comprising a seat element having a valve seat, an opening through said seat, an end wall opposite said opening and a port between said end wall and said seat and communicating with said opening, a valve element having a cylindrical wall portion externally of and slidable over said end wall between a seating position relatively to said seat and closing said port and a position spaced from said seat and exposing said port and a float rigidly connected to said valve element coaxially therewith for opening and closing the valve in accordance with the level of a liquid by which said float is buoyantly supported.

3. A float-controlled valve, comprising a seat element having a valve seat, an opening through said seat, an end wall opposite said opening and a port between said end wall and said seat and communicating with said opening, a valve element externally of and slidable on said seat element between a position against said seat and closing said port and a position exposing said port, a guide stem carried by and projecting outwardly from said end wall and a float rigidly connected to said valve element coaxially therewith and slidable on said stem for opening and closing the valve in accordance with the level of a liquid by which said float is buoyantly supported.

4. A float-controlled valve, comprising a seat element having a valve seat, an opening through said seat, an end wall opposite said opening and a port between said end wall and said seat and communicating with said opening, a valve element having a cylindrical portion externally of and slidable on said seat element between a position wherein one end is in seating position relatively to said seat and closes said port and a position away from said seat and exposing said port and a float portion at the other end of said cylindrical portion for opening and closing the valve in accordance with the level of a liquid by which said valve element is buoyantly supported.

5. A float-controlled valve, comprising a seat element having a valve seat, an opening through said seat, an end wall opposite said opening and a port between said end wall and said seat and communicating with said opening, a valve element having a cylindrical portion externally of and slidable on said seat element between a seating position relatively to said seat and closing said port and a position exposing said port, said cylindrical portion having an opening therein outwardly beyond said end wall for constantly venting the space between said cylindrical portion and said end wall and a float rigidly connected to said valve element coaxially therewith for opening and closing the valve in accordance with the level of a liquid by which said float is buoyantly supported.

6. A float-controlled valve comprising a seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position closing said port and an open position wherein said port is exposed, and a float rigidly connected to said valve element coaxially therewith and on the opposite side of said end wall from said port for opening and closing said valve in accordance with the level of a liquid in which said float is buoyantly supported.

7. A float-controlled valve comprising a seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position closing said port and an open position wherein said port is exposed and a float rigidly connected to said valve element coaxially therewith and on the opposite side of said end wall from said port for opening and closing said valve in accordance with the level of a liquid in which said float is buoyantly supported, the external diameters of said valve element and said float each being not substantially greater than the external diameter of said side wall.

8. A float-controlled valve comprising a seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position closing said port and an open position wherein said port is exposed, a guide stem projecting from said end wall in a direction away from said tubular wall and coaxially therewith and a float rigidly connected to said valve element coaxially therewith and on the opposite side of said end wall from said port and slidable over said guide stem for opening and closing said valve in accordance with the level of a liquid in which said float is buoyantly supported.

9. A float-controlled valve comprising a relatively fixed seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position closing said port and an open position wherein said port is exposed, a guide stem secured to and projecting from said end wall in a direction away from said tubular member and coaxially therewith, a float rigidly connected to said valve element coaxially therewith and on the opposite side of said end wall from said port for opening and closing said valve in accordance with the level of a liquid in which said float is buoyantly supported, and having an axial passage therein receiving said guide stem, and a stop on the outer, free end of said guide stem for limiting the movement of said float in a direction away from said end wall.

10. A float-controlled valve comprising a relatively fixed seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position closing said port and an open position wherein said port is exposed and a float rigidly connected to said valve element coaxially therewith and on the opposite side of said end wall from said port for opening and closing said valve in accordance with the level of a liquid in which said float is buoyantly supported, said valve element having an opening therein positioned to be located outwardly beyond said end wall, in a direction away from said port, in all positions of said valve element.

11. A float-controlled valve comprising a relatively fixed seat element having a generally cylindrical tubular portion, an end wall portion, a plurality of ribs extending between and secured to said side wall portion and said end wall portion and supporting the latter, spaced from and coaxial with said side wall portion, the spaces between said ribs providing ports opening into the interior of said seat element, an external seat formed on the end of said side wall portion nearest said ports, a tubular, generally cylindrical valve element slidable over said seat element externally and coaxially thereof between a seating position closing said port and an open position wherein said port is exposed and a float rigidly connected to said valve element coaxially therewith and on the opposite side of said end wall from said port for opening and closing said valve in accordance with the level of a liquid in which said float is buoyantly supported.

12. A float-controlled valve comprising a relatively fixed seat element having a generally cylindrical tubular side wall open at one end, an end wall closing the other end, an external seat intermediate the ends of said seat element and a port in said seat element intermediate said end wall and said seat and opening into the interior of said seat element, a tubular, generally cylindrical valve element slidable over said seat element externally and coaxially thereof between a seating position in close proximity to but slightly spaced from said seat and substantially closing said port and an open position wherein said port is exposed and a float rigidly connected to said valve element coaxially therewith and on the opposite side of said end wall from said port for opening and closing said valve in accordance with the level of a liquid in which said float is buoyantly supported.

References Cited in the file of this patent
UNITED STATES PATENTS

| | | |
|---|---|---|
| 772,369 | Parrish | Oct. 18, 1904 |
| 1,219,567 | Leitch | Mar. 20, 1917 |